United States Patent [19]

Farnham

[11] 4,274,120

[45] Jun. 16, 1981

[54] INFORMATION RECORDING METHODS AND APPARATUS

[75] Inventor: Stewart E. Farnham, Mountain View, Calif.

[73] Assignee: Bell & Howell Company, Chicago, Ill.

[21] Appl. No.: 5,539

[22] Filed: Jan. 22, 1979

[51] Int. Cl.³ .................... G11B 5/54; G11B 21/08
[52] U.S. Cl. ...................................... 360/106; 360/64
[58] Field of Search ............................. 360/105–106, 360/109, 88, 90, 78, 122, 64

[56] References Cited

U.S. PATENT DOCUMENTS

| | | | |
|---|---|---|---|
| 2,751,274 | 6/1956 | Andrews | 360/106 X |
| 3,361,878 | 1/1968 | Patterson et al. | 360/64 |
| 4,156,258 | 5/1979 | Schoettle et al. | 360/106 X |

Primary Examiner—John H. Wolff
Attorney, Agent, or Firm—Benoit Law Corporation

[57] ABSTRACT

Information is recorded in several parallel tracks with a recording device on a recording tape having edges parallel to such tracks. The tape is curved between the parallel edges. The recording device is applied to the tape in information transducing relationship and information is recorded serially in the parallel tracks by moving the tape relative to the applied recording device in a direction parallel to the tape edges. Information is selectively applied to the recording device for recordation on the tape, the recording device is restrained against any movement having a component extending away from either of the edges as long as an information recording takes place in any of the tracks. The mentioned restraint is selectively released between recordations in different tracks and the recording device is incremented angularly along the curvature of the curved tape from one to another of the different tracks.

The same principle is applied to a reproduction of information from several parallel tracks on a tape.

15 Claims, 3 Drawing Figures

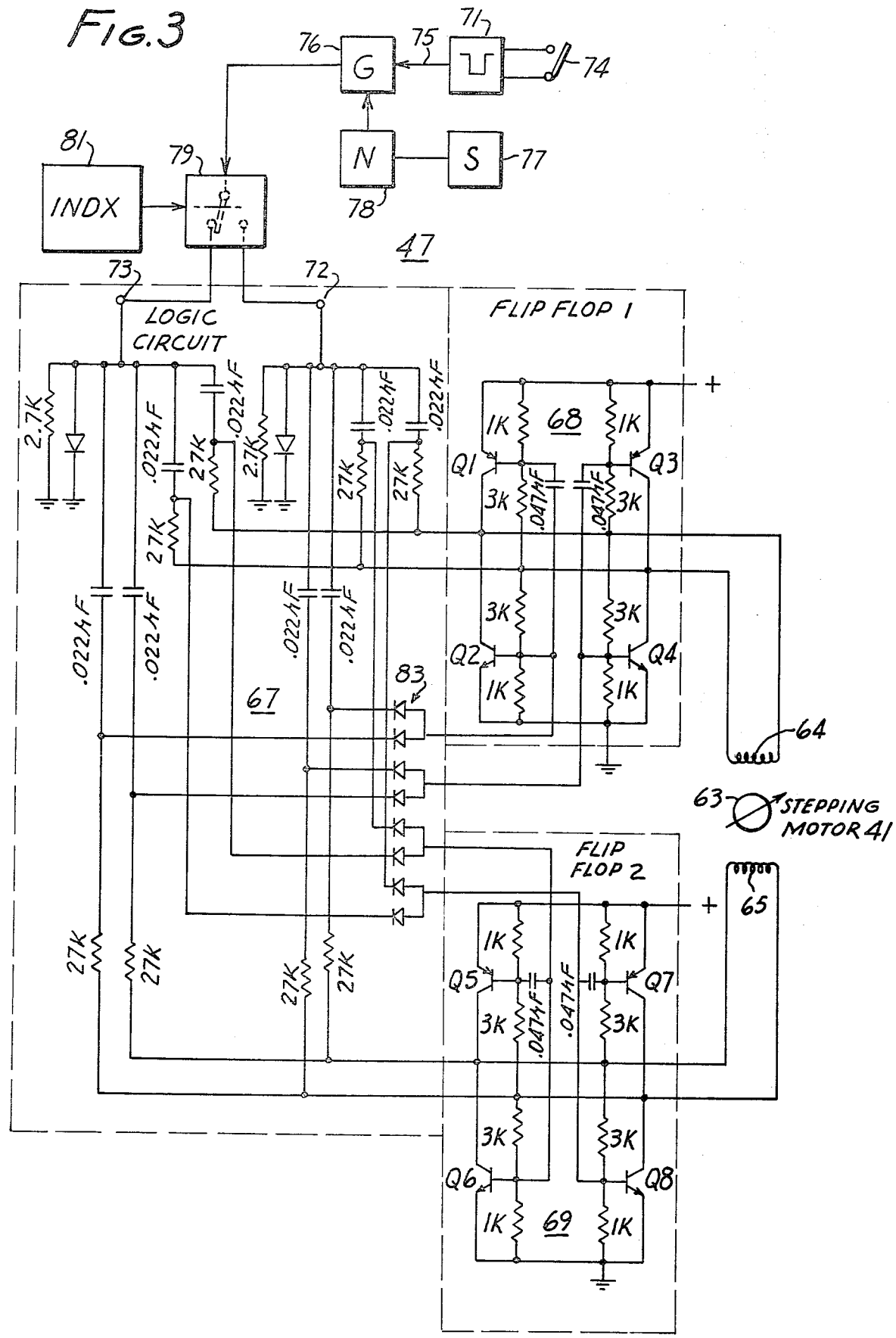

INFORMATION RECORDING METHODS AND APPARATUS

BACKGROUND OF THE INVENTION

1. Field of the Invention

The subject invention relates to information recording and playback methods and apparatus and, more specifically, to methods and apparatus for recording information in several parallel tracks on a recording tape and for playing back information recorded in several parallel tracks on a tape.

2. Prior-Art Statement

A multitude of methods and apparatus for recording information either serially or simultaneously in several parallel tracks on a tape or other recording medium are known.

For instance, U.S. Pat. No. 3,504,133 proposes cam-operated indexing means for shifting a magnetic playback head transversely of a tape between positions associated with various tracks thereon.

With known transverse recording or playback head shifting systems, it is difficult to surpass a certain performance and accuracy of operation for very high quality operation.

On the other hand, transverse scan or slant track high quality recording systems record information in transverse or slanted tracks, as may, for instance, be seen from U.S Pat. Nos. 2,979,558, 3,099,709, 3,062,922, 3,136,866, 3,172,961, 3,243,521, 3,283,068, 3,333,064, 3,361,878, and 3,535,468.

SUMMARY OF THE INVENTION

It is a general object of this invention to overcome the above mentioned disadvantages.

It is a germane object of this invention to provide improved methods and apparatus for recording information in several parallel tracks on a recording tape having edges parallel to these tracks.

It is a related object of this invention to provide improved methods and apparatus for recording information serially in several parallel tracks with a recording device on a recording tape having edges parallel to these tracks.

It is also an object of this invention to provide improved methods and apparatus for reproducing information recorded in several parallel tracks on a tape having edges parallel to these tracks.

It is a related object of this invention to provide improved methods and apparatus for reproducing, with an information playback device, information erially from several parallel tracks from a tape having edges parallel to these tracks.

Other objects of this invention will become apparent in the further course of this disclosure.

From a first aspect thereof, the subject invention resides in a method of recording information in several parallel tracks with a recording device on a recording tape having edges parallel to these tracks. The method according to this aspect of the invention comprises in combination the steps of curving the tape between its parallel edges, applying the recordng device to the tape in information transducing relationship and recording information serially in the parallel tracks by moving the tape relative to the applied recording device in a direction parallel to the edges, selectively applying information to the recording device for recordation on the tape, restraining the recording device against any movement having a component extending away from either of the tape edges as long as an information recordation takes place in any of the tracks, and selectively releasing the restraint between recordations in different tracks and incrementing the recording device angularly along the curvature of the curved recording tape from one to another of the different tracks.

From another aspect thereof, the subject invention resides in a method of recording information in several parallel tracks with a recording device on a recording tape having edges parallel to these tracks. The method according to this aspect of the invention comprises in combination the steps of providing a circular recording device carrier having an axis of rotation, mounting the recording device at the periphery of the circular carrier, curving the recording tape between the parallel edges about part of the circular carrier, angularly moving the circular carrier about the axis of rotation to position the peripherally mounted recording device in information transducing relationship at the curved tape, and recording information serially in the parallel tracks by moving the tape relative to the peripherally mounted recording device in a direction parallel to the axis of rotation, selectively applying information to the recording device for recordation on the tape, restraining the circular carrier against movement about the axis of rotation as long as the recordation takes place in any of the tracks, and selectively releasing the restraint between recordations in different tracks and angularly incrementing the circular carrier about the axis of rotation to index the mounted recording device from one to another of the different tracks.

From another aspect thereof, the subject invention resides in a method of reproducing, with an information playback device, information recorded in several parallel tracks on a tape having edges parallel to these tracks. The method according to this aspect of the invention comprises in combination the steps of curving the tape between the parallel edges, applying the playback device to the tape in information transducing relationship and reproducing recorded information serially from the parallel tracks by moving the tape relative to the applied recording device in a direction parallel to the edges, applying the playback device in information transducing relationship to one and subsequently serially to others of the tracks on the tape, restraining the playback device against any movement having a component extending away from either of the edges as long as reproduction of information takes place from the one or any other of the tracks, and selectively releasing the restraint between playback operations from different tracks and incrementing the playback device angularly along the curvature of the curved tape from one to another of the different tracks.

From another aspect thereof, the subject invention resides in a method of reproducing, with an information playback device, information recorded in several parallel tracks on a tape having edges parallel to these tracks. The method according to this aspect of the invention comprises in combination the steps of providing a circular playback device carrier having an axis of rotation, mounting the playback device at the periphery of the circular carrier, curving the tape between the parallel edges about part of the circular carrier, angularly moving the circular carrier about the axis of rotation to position the peripherally mounted playback device in information transducing relationship at the curved tape, and reproducing information serially from the parallel tracks by moving the tape relative to the peripherally mounted recording device in a direction parallel to the axis of rotation, selectively applying the playback device in information transducing relationship to one and subsequently serially to others in the tracks on the tape, restraining the circular carrier against movement about the axis of rotation as long as the reproduction of information takes place from any of the tracks, and selectively releasing the restraint between reproductions of information from different tracks and angularly incrementing the circular carrier about the axis of rotation to index the mounted playback device from one to another of the different tracks.

From another aspect thereof, the subject invention resides in apparatus for recording information in several parallel tracks on a recording tape having edges parallel to these tracks, comprising, in combination, means for curving the tape between the parallel edges, means coupled to the tape for moving the curved tape in a direction parallel to the edges, and means for serially recording information in the parallel tracks on the recording tape including a recording device, means for applying the recording device to the moving tape in information transducing relationship, means connected to the recording device for selectively applying information to the recording device for recordation on the tape, means for restraining the recording device against any movement having a component extending away from either of the edges as long as an information recordation takes place in any of the tracks and for selectively releasing the restraint between recordations in different tracks and incrementing the recording device angularly along the curvature of the curved tape from one to another of the different tracks.

From another aspect thereof, the subject invention resides in apparatus for recording information in several parallel tracks on a recording tape having edges parallel to these tracks, comprising, in combination, means for recording information on the tape including an information recording device, a circular carrier for the recording device, means connected to the recording device and the carrier for mounting the recording device at the periphery of the circular carrier, means for curving the recording tape between the parallel edges about part of the circular carrier, means coupled to the tape for moving the curved tape relative to the peripherally mounted recording device in a direction parallel to the axis of rotation, means coupled to the carrier for indexing the recording device among the parallel tracks by incrementing the carrier about the axis of rotation and for restraining the carrier against movement about the axis of rotation between indexing operations, and means connected to the recording device for applying information to the recording device for recordation in the tracks while the carrier is restrained against movement about the axis of rotation.

From another aspect thereof, the subject invention resides in apparatus for reproducing information recorded in several parallel tracks on a tape having edges parallel to these tracks, comprising, in combination, means for curving the tape between the parallel edges, means coupled to the tape for moving the curved tape in a direction parallel to the edges, and means for serially reproducing information from the parallel tracks on the recording tape including a playback device, means for applying the playback device to the moving tape in information transducing relationship, means connected to the playback device for selectively deriving information played back, by the playback device, from the tape, means for restraining the playback device against any movement having a component extending away from either of the edges as long as a playback of information takes place from any of the tracks and for selectively releasing the restraint between playbacks of information from different tracks and incrementing the playback device angularly along the curvature of the curved tape from one to another of the different tracks.

From another aspect thereof, the subject invention resides in apparatus for reproducing information recorded in several parallel tracks on a tape having edges parallel to these tracks, comprising, in combination, means for reproducing information from the tape including an information playback device, a circular carrier for the playback device, means connected to the playback device and the carrier for mounting the playback device at the periphery of the circular carrier, means for curving the recording tape between the parallel edges about part of the circular carrier, means coupled to the tape for moving the curved tape relative to the peripherally mounted recording device in a direction parallel to the axis of rotation, means coupled to the carrier for indexing the playback device among the parallel tracks by incrementing the carrier about the axis of rotation and for restraining the carrier against movement about the axis of rotation between indexing operations, and means connected to the playback device for deriving information reproduced from any of the tracks while the carrier is restrained against movement about the axis of rotation.

BRIEF DESCRIPTION OF THE DRAWINGS

The subject invention and its aspects and objects will become more readily apparent from the following detailed description of preferred embodiments thereof, illustrated by way of example in the accompanying drawings, in which like reference numerals designate like or functionally equivalent parts, and in which:

FIG. 3 is a circuit diagram of a motor control which may be employed in the system and apparatus of FIGS. 1 and 2.

DESCRIPTION OF PREFERRED EMBODIMENTS

Figure 1:
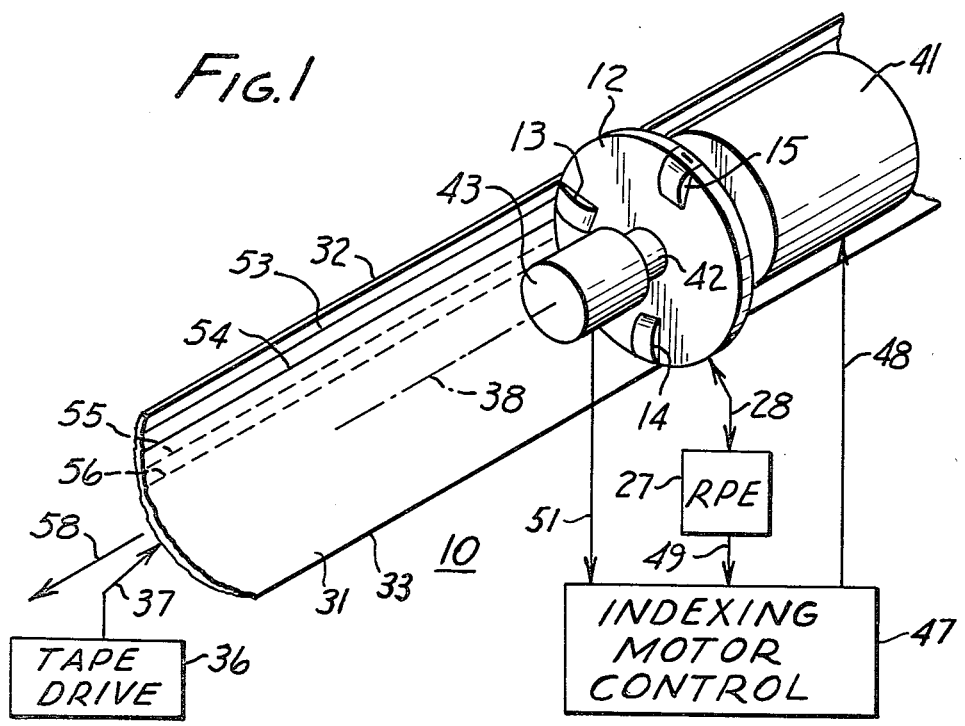
FIG. 1 is a partially perspective and partially diagrammatic view of a tape information recording and playback system according to a preferred embodiment of the subject invention.
Figure 2:
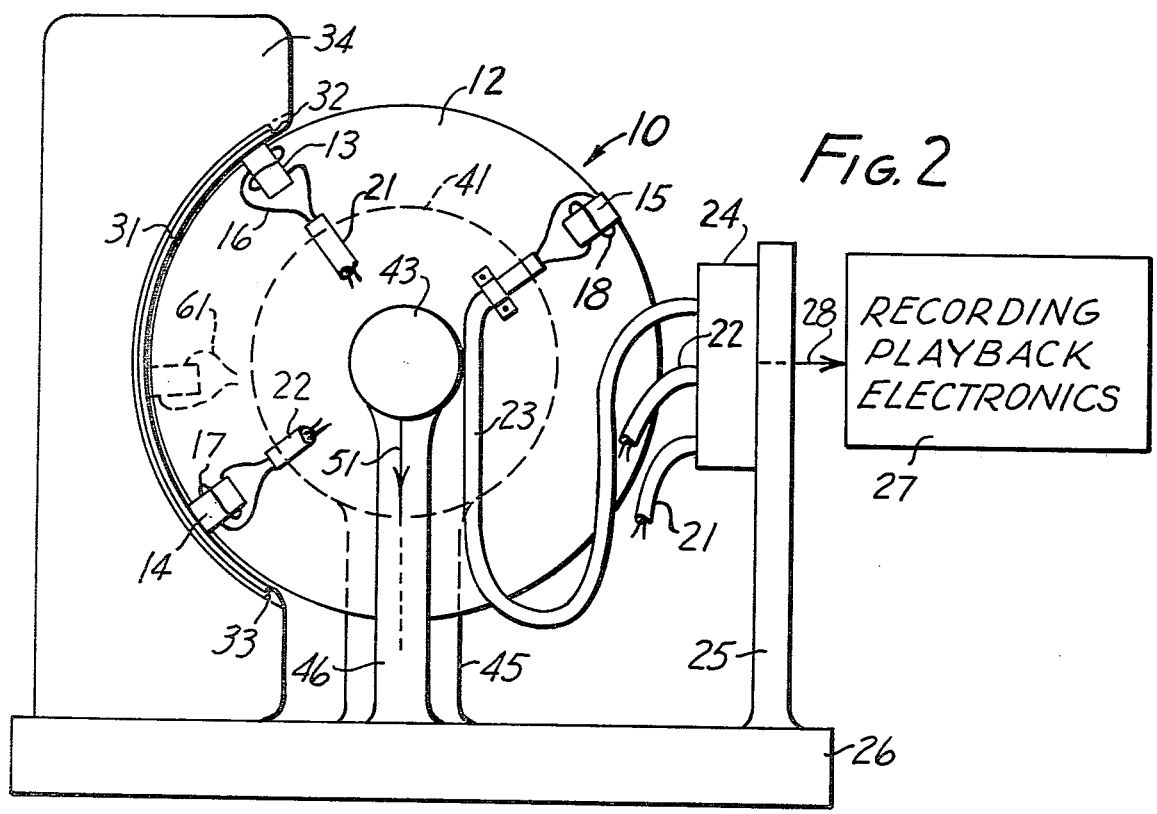
FIG. 2 is a side view of a tape information recording and playback apparatus including the system of FIG. 1 in accordance with a preferred embodiment of the subject invention.

The tape recording and playback system 10 of FIGS. 1 and 2 includes a circular carrier or head disk 12 having recording and/or playback heads 13, 14 and 15 mounted at the periphery thereof. As seen in FIG. 2, the heads 13, 14 and 15 have windings 16, 17 and 18, respectively. These windings are, respectively, connected by cables 21, 22 and 23 to a terminal box 24 mounted on a standard 25 attached to a baseplate 26.

The terminal box 24, in turn, is connected to a recording and/or playback electronics 27 which may be of a conventional type. A line 28 in FIGS. 1 and 2 indicates the connection between the terminal box 24 and electronics 27.

The or any of the heads 13, 14 and 15 and the playback electronics 27 connected thereto thus constitute means for recording and/or reproducing information relative to the tape with any of the heads constituting an information recording and/or playback device.

The system of FIGS. 1 and 2 uses a magnetic recording tape 31 having parallel edges 32 and 33. A curved lateral tape guide 34 acts as a means for continuously curving the recording tape 31 between the parallel edges 32 and 33 about part of the circular carrier or head disk. A tape drive 36 symbolically shown in FIG. 1 as coupled to the tape 31 at 37 moves or advances the curved tape relative to any of the peripherally mounted recording devices 13 et seq. in a direction parallel to the tape edges 32 and 33 or, in other words, to an axis of rotation 38 of the head carrier or disk 12. In the illustrated embodiments of the invention, the lateral tape guide 34 and the tape 31 are curved concavely, and heads 13, 14 and 15 are applied to the concavely curved side of the tape 31, as apparent from FIGS. 1 and 2.

The concept of curving the tape 31 between the parallel edges 32 and 33 implies that the arc of curvature of the tape 31 intersects the edges 32 and 33 or that the tape 31 defines part of a cylinder of which each edge 32 and 33 is parallel to a generatrix of the cylinder.

The equipment so far described with reference to the drawings may be of a conventional nature or design. For instance, such equipment may be of the type used in transverse scan video tape recorders and the following U.S. patents are herewith incorporated by reference herein for such equipment and parts: U.S. Pat. Nos. 2,979,558, by E. M. Leyton, issued Apr. 11, 1961, 3,099,709, by L. D. Barry, issued July 30, 1963, 3,136,866, by L. D. Barry, issued June 9, 1964, 3,172,961, by L. D. Barry, issued Mar. 9, 1965, 3,243,521, by W. E. Lock, issued Mar. 29, 1966, 3,283,068, by D. E. Urry et al, issued Nov. 1, 1966, 3,333,064, by D. P. Dolby, issued July 25, 1967, and 3,361,878, by D. M. Patterson et al, issued Jan. 2, 1968.

However, this is where the similarity with the prior art ends.

In particular, the system shown in FIGS. 1 and 2 has an indexing or stepping motor 41 coupled to the head disk 12 via a shaft 42 which also has a rotary head position pickup device 43 connected thereto. As seen in FIG. 2, the motor 41 and pickup 43 may be mounted on standards 45 and 46, respectively, attached to the baseplate 26 and mounting also the head disk 12 via the shaft 42. An indexing or stepping motor control 47 is connected to the stepping motor 41 via a line 48 for selectively restraining, releasing and incrementing any recording device or head 13 et seq. via the stepping motor. To this end, the motor 47 is controlled via a line 49 by the recording and/or playback electronics 27 and via a line 51 by the head position pickup 43.

As a major distinguishing feature relative to the type of prior art incorproated by reference herein, the stepping motor 41 and control 47 restrain any recording or playback device 13 et seq. against any movement having a component extending away from either of the tape edges 32 and 33 as long as an information recordation or playback takes place with respect of any of the parallel recording tracks 53, 54, 55, 56 etc. while the tape is moving in the direction 58 or in a direction opposite thereto; that is, as long as the tape 31 is moving in parallel to the edges 32 and 33 or the axis of rotation 38. This is completely contrary to the above mentioned transverse scan or slant track recording systems in which the recording or playback heads are, in effect, moving transversely across the tape or at a slanted angle relative to the tape edges.

The recording and/or playback electronics 27 thus inhibits via line 49 and motor control 47 any stepping of the head disk 12 by the motor 41 as long as information is recorded in, or reproduced from, any of the tracks 43 etc.; or, in other words, as long as information is applied to any recording device, or is derived from any playback device, via line 28.

On the other hand, the motor control 47 selectively releases its restraints of the head disk motion between recordations or playbacks in different tracks 53, 54, 55, 56, etc.

In particular, the motor control 47 and stepping motor 41 then increment the particular recording or playback device 13 etc. angularly along the curvature of the curved tape 31 from one to another of the different tracks 53 etc.

In other words, the head disk position pickup 43, motor control 47 and stepping motor 41 index the particular recording or playback device 13 etc. among the parallel tracks 53 to 56 etc. by incrementing the carrier or head disk 12 about the axis of rotation 38.

By way of example, the head 13 records information from the source 27 in a first track 53 parallel to the edges 32 and 33 while the tape 31 is moved in the direction 58 in parallel to the tape edges 32 and 33 and the axis of rotation 38, and while the device 13 applied to the recording tape 31 is releasably restrained by the control 47 and stepping motor 41 against any movement having a component extending away from either of the edges 32 and 33.

The motor control 47 acting on the stepping motor 41 via line 48 subsequently releases its restraint and increments the recording device 13 angularly along the curvature of the curved recording tape 31 to a second track 54 by incrementally rotating the head disk 12 about the axis 38. The head disk position pickup 43 exercises a check over the actual position of the incremented recording device 13 and monitors the motor control 47 accordingly via line 51.

The recording device 13 then records information in a second track 54 parallel to the edges 32 and 33 while the tape 31 moves relative to the incremented recording device 13 in the direction 54. During such recording in the second track 54, the motor control 47 and stepping motor 41 restrain the incremented recording device 13 against any movement having a component extending away from either of the tape edges 32 and 33.

The latter restraint is subsequently released and the motor control 47 and stepping motor 41 further increment the recording device 13 angularly along the curvature of the curved recording tape by stepping the head disk 12 and recording device 13 to a third track 55.

The recording tape 31 is then further moved in the direction 58 relative to the twice incremented recording device 13 and information from the source 27 is recorded in the third track 55 parallel to the tape edges 32 and 33 by restraining the further incremented recording device 13 against any movement having a component extending away from either tape edge 32 and 33.

This alternate incrementing and motion restraint may be carried on further to record information in as many tracks as desired and feasible on the recording tape 13. In addition, or alternatively, the same principle may be employed in reproducing recorded information from several tracks.

As far as the head carrier 12 is concerned, the expression "circular" as herein employed is intended to be broad enough to cover sector or segment-shaped head carriers as alternatives to fully circular configurations.

Within the broad contemplation of the subject invention, the head disk 12 with heads 13, 14 and 15 may operate in the manner of a turret indexing different or different kinds of recording and/or playback devices into information transducing relationship with the moving tape.

The subject invention has particular utility in serially recording information in a first track, then in a second track, and then in a third track and so on until all information has been recorded on the tape or the capacity of the tape has been exhausted. If desired, such information may proceed boustrophedonically by moving the tape alternatively from end to end in parallel to the axis of rotation 38 in opposite directions.

On the other hand, the broad contemplation of the subject invention does not rule out parallel recording of information simultaneously in different parallel tracks. For instance, as indicated in dotted outline in FIG. 2, a further recording device 61 may be peripherally mounted on the head disk 12 at an angle from the device 13, and these heads 13 and 61 may then be simultaneously employed to record information in parallel tracks simultaneously. Many other variations are conceivable on the basis of the subject extensive disclosure within the broad contemplation of the present invention.

Apparatus for controlling the stepping motor 41 is diagrammatically shown in FIG. 3. The stepping motor 41 has an armature 63 and windings 64 and 65 consituting, respectively phase 1 and phase 2. The shaft position of the position of the stepping motor 41 is fixed in one of several definite positions by the application of direct-current voltages to the windings 64 and 65.

If the voltage applied to one of these two windings is reversed, the stepping motor 14 will move the head disk 12 by a predetermined angular position, for holding it there in a new position. The armature 63 with energized windings 64 and 65 thus provide a detent action which holds the head disk 12 ridgidly in position between angular advancements. The direction of angular advancement of the head disk 12 is determined by the order in which the polarities of the applied voltages are reversed on the two windings 64 and 65. For instance, the phase of winding 64 leads that of winding 65 for angular advancement of the head disk 12 in a first sense of rotation. Conversely, the phase of winding 65 leads that of winding 64 for angular advancement of the head disk 12 in the opposite sense of rotation.

The drive circuitry of the stepping motor includes a logic circuit or network 67 and a pair of flip-flop circuits 68 and 69. The flip-flop circuit 68 includes two complementary pairs of transistors Q1, Q2 and Q3, Q4. Similarly, the flip flop 69 includes two complementary pairs of transistors Q5, Q6 and Q7, Q8. The flip-flop circuits 68 and 69 energize the motor windings 64 and 65 as shown in FIG. 3.

The motor control also includes a pulse generator 71 for selectively supplying negative pulses to the forward input 72 and reverse input 73 of the logic circuit 67. To this end, the pulse generator 71 may be provided with an on-off switch 74 which, depending on its position, either permits or inhibits the generation of negative pulses at an output 75 applied to a gate 76.

A sensor 77 energizes a NOT circuit 78 which, in turn, energizes the gating input of the gate 76. As long as the sensor 77 does not energize the input of the NOT circuit 78, the gate 76 transfers output pulses of the generator 71 to an input of a further gate 79.

The gate 79, in turn, determines which of the logic circuit inputs 72 and 73 will receive negative pulses from the generator 71 at the time.

In contrast to transverse scan and slant track recording, the head disk 12 does not move angularly as long as information is being recorded by any one or more heads 13, 14, 15 or 61 in any of the tracks on the recording tape 31. Accordingly, the sensor 77 may be a signal pickup or sensing device which, for instance, as part of the recording and playback electronics 27, determines when information to be recorded is applied to any of the recording heads and when information recorded on the tape 31 is reproduced by any playback head 13, etc. In such case, the sensor 77 energizes the NOT element 78 thereby preventing the gate 76 from applying any pulses from the generator 71 to the second gate 79. Conversely, if the sensor 77 does not sense the presence of any recording or playback signal, the NOT element 78 applies a gating input to the gate 76, whereby pulses from the generator 71 may flow to the second gate 79. By way of further example, the sensor 77 may be part of the tape drive 36 or may otherwise sense whether the tape 31 is moving in either forward or reverse direction.

In that case, the sensor 77 would again suspend application of negative pulses to the second gate 79 by action on the NOT element 78 as long as the tape 31 is moving. When the tape 31 has stopped, then the output of the NOT element 78 resumes and the gate 76 may again apply pulses from the generator 71 to the second gate 79.

The second gate 79 may be switched by an indexing device 81 which may be actuated by the rotary head position pickup device 43 in a conventional manner to indicate with a signal applied to the gate 79 when a predetermined angular position of the head disk 12 has reached either of the lateralborders of the recording area on the tape 31 in the vicinity of either tape margin 32 and 33.

For instance, if the head 13 on the disk 12 has reached such a position at the tape edge 32 that further forward movement of the head disk would move the head 13 off the tape, then the indexing device 81 would switch the gate 79 so that pulses are applied from the generator 71 to the reverse input terminal 73 of the logic circuit 67. This logic circuit, in turn, would then apply the particular pulses via leads and OR elements 83 to the flip-flop circuits 68 and 69 as shown in FIG. 3, so as to advance the motor 41 and head disk 12 by one step in the reverse direction, whereby the recording head 13 is shifted from the extreme outer track 53 to the next inner track 54.

If the head 13 through successive steps, has reached the extreme recording track at the tape edge 33, the indexing device 81 switches the gate so that further pulses from the generator 71 are applied to the forward input terminal 72 of the logic circuit 67, whereby the stepping motor 41 will step the head from the latter extreme track to the next inner track.

Of course, these explanations are not intended to be exhaustive, but rather to be suggestive of the large variety of switching operations that can be carried out with the illustrated system and other embodiments of the subject invention.

By way of example, a suitable detent action stepping motor is available from the Cedar Engineering Division of Control Data Corporation, in Minneapolis, Minn., which has also provided the logic circuit 67 and flip-flop circuits 68 and 69 in one of their descriptive brochures entitled "Application Ideas".

Moreover, the subject extensive disclosure will render apparent or suggest to those skilled in the art various modifications and variations within the spirit and scope of the subject invention.

I claim:

1. A method of recording information in several parallel tracks with a recording device on a recording tape having edges parallel to said tracks, comprising in combination the steps of:

curving said tape between said parallel edges;

applying said recording device to said tape in information transducing relationship and recording information serially in said parallel tracks by moving said tape relative to said applied recording device in a direction parallel to said edges, selectively applying information to said recording device for recordation on said tape, restraining said recording device against any movement having a component extending away from either of said edges as long as an information recordation takes place in any of said tracks, and selectively releasing said restraint, between recordations in different tracks and incrementing said recording device angularly along the curvature of said curved tape from one to another of said different tracks.

2. A method of recording information in several parallel tracks with a recording device on a recording tape having edges parallel to said tracks, comprising in combination the steps of:

providing a circular recording device carrier having an axis of rotation;

mounting said recording device at the periphery of said circular carrier;

curving said recording tape between said parallel edges about part of said circular carrier;

angularly moving said circular carrier about said axis of rotation to position said peripherally mounted recording device in information transducing relationship at said curved tape; and recording information serially in said parallel tracks by moving said tape relative to said peripherally mounted recording device in a direction parallel to said axis of rotation, selectively applying information to said recording device for recordation on said tape, restraining said circular carrier against movement about said axis of rotation as long as said recordation takes place in any of said tracks, and selectively releasing said restraint between recordations in different tracks and angularly incrementing said circular carrier about said axis of rotation to index said mounted recording device from one to another of said different tracks.

3. A method of reproducing, with an information playback device, information recorded in several parallel tracks on a tape having edges parallel to said tracks, comprising in combination the steps of:

curving said tape between said parallel edges;

applying said playback device to said tape in information transducing relationship and reproducing recorded information serially from said parallel tracks by moving said tape relative to said applied recording device in a direction parallel to said edges, applying said playback device in information transducing relationship to one and subsequently serially to others of said tracks on said tape, restraining said playback device against any movement having a component extending away from either of said edges as long as reproduction of information takes place from said one or any other of said tracks, and selectively releasing said restraint, between playback operations from different tracks and incrementing said playback device angularly along the curvature of said curved tape from one to another of said different tracks.

4. A method as claimed in claim 1 or 3, wherein:

said tape is continuously curved concavely between said parallel edges; and said recording device is applied to the concavely curved side of the tape.

5. A method of reproducing, with an information playback device, information recorded in several parallel tracks on a tape having edges parallel to said tracks, comprising in combination the steps of:

providing a circular playback device carrier having an axis of rotation;

mounting said playback device at the periphery of said circular carrier;

curving said tape between said parallel edges about part of said circular carrier;

angularly moving said circular carrier about said axis of rotation to position said peripherally mounted playback device in information transducing relationship at said curved tape; and reproducing information serially from said parallel tracks by moving said tape relative to said peripherally mounted recording device in a direction parallel to said axis of rotation, selectively applying said playback device in information transducing relationship to one and subsequently serially to others in said tracks on said tape, restraining said circular carrier against movement about said axis of rotation as long as said reproduction of information takes place from any of said tracks, and selectively releasing said restraint between reproductions of information from different tracks and angularly incrementing said circular carrier about said axis of rotation to index said mounted playback device from one to another of said different tracks.

6. Apparatus for recording information in several parallel tracks on a recording tape having edges parallel to said tracks, comprising in combination:

means for curving said tape between said parallel edges;

means coupled to said tape for moving said curved tape in a direction parallel to said edges; and means for serially recording information in said parallel tracks on said recording tape including a recording device, means for applying said recording device to said moving tape in information transducing relationship, means connected to said recording device for selectively applying information to said recording device for recordation on said tape, means for restraining said recording device against any movement having a component extending away from either of said edges as long as an information recordation takes place in any of said tracks and for selectively releasing said restraint between recordations in different tracks and incrementing said recording device angularly along the curvature of said curved tape from one to another of said different tracks.

7. Apparatus as claimed in claim 6, wherein:
said restraining, releasing and incrementing means include a stepping motor coupled to said recording device applying means, and stepping motor control means connected to said stepping motor for selectively restraining, releasing and incrementing said recording device via said stepping motor.

8. Apparatus for reproducing information recorded in several parallel tracks on a tape having edges parallel to said tracks, comprising in combination:
means for curving said tape between said parallel edges;
means coupled to said tape for moving said curved tape in a direction parallel to said edges; and
means for serially reproducing information from said parallel tracks on said recording tape including a playback device, means for applying said playback device to said moving tape in information transducing relationship, means connected to said playback device for selectively deriving information played back by said playback device from said tape, means for restraining said playback device against any movement having a component extending away from either of said edges as long as a playback of information takes place from any of said tracks and for selectively releasing said restraint between playbacks of information from different tracks and incrementing said playback device angularly along the curvature of said curved tape from one to another of said different tracks.

9. Apparatus as claimed in claim 8, wherein:
said restraining, releasing and incrementing means include a stepping motor coupled to said playback device applying means, and stepping motor control means connected to said stepping motor, for selectively restraining, releasing and incrementing said playback device via said stepping motor.

10. Apparatus as claimed in claim 6, 7, 8 or 9, wherein:
said curving means include a curved lateral tape guide for continuously curving the tape between said parallel edges; and
said applying means include means for applying said recording device to the continuously curved tape.

11. Apparatus as claimed in claim 6, 7, 8 or 9, wherein:
said curving means include a concavely curved lateral tape guide for continuously curving the tape between said parallel edges; and
said applying means include means for applying said recording device to the concavely curved side of the tape.

12. Apparatus for recording information in several parallel tracks on a recording tape having edges parallel to said tracks, comprising in combination:
means for recording information on said tape including an information recording device;
a circular carrier for said recording device;
means connected to said recording device and said carrier for mounting said recording device at the periphery of said circular carrier;
means for curving said recording tape between said parallel edges about part of said circular carrier;
means coupled to said tape for moving said curved tape relative to said peripherally mounted recording device in a direction parallel to said axis of rotation;
means coupled to said carrier for indexing said recording device among said parallel tracks by incrementing said carrier about said axis of rotation and for restraining said carrier against movement about said axis of rotation between indexing operations; and
means connected to said recording device for applying information to said recording device for recordation in said tracks while said carrier is restrained against movement about said axis of rotation.

13. Apparatus as claimed in claim 12, wherein:
said indexing and restraining means include a stepping motor coupled to said carrier, and stepping motor control means for incrementing said carrier about said axis of rotation and selectively restraining said carrier against movement about said axis of rotation between indexing operations.

14. Apparatus for reproducing information recorded in several parallel tracks on a tape having edges parallel to said tracks, comprising in combination:
means for reproducing information from said tape including an information playback device;
a circular carrier for said playback device;
means connected to said playback device and said carrier for mounting said playback device at the periphery of said circular carrier;
means for curving said recording tape between said parallel edges about part of said circular carrier;
means coupled to said tape for moving said curved tape relative to said peripherally mounted recording device in a direction parallel to said axis of rotation;
means coupled to said carrier for indexing said playback device among said parallel tracks by incrementing said carrier about said axis of rotation and for restraining said carrier against movement about said axis of rotation between indexing operations; and
means connected to said playback device for deriving information reproduced from any of said tracks while said carrier is restrained against movement about said axis of rotation.

15. Apparatus as claimed in claim 14, wherein:
said indexing and restraining means include a stepping motor coupled to said carrier, and stepping motor control means for incrementing said carrier about said axis of rotation and selectively restraining said carrier against movement about said axis of rotation between indexing operations.

* * * * *